United States Patent [19]

Balinsky et al.

[11] 4,255,289
[45] Mar. 10, 1981

[54] PROCESS FOR THE PREPARATION OF MAGNETIC CATALYSTS

[75] Inventors: George J. Balinsky; Lloyd A. Pine; Joseph K. Mertzweiller, all of Baton Rouge, La.

[73] Assignee: Exxon Research & Engineering Co., Florham Park, N.J.

[21] Appl. No.: 106,494

[22] Filed: Dec. 26, 1979

[51] Int. Cl.$^3$ .................. B01J 21/04; B01J 23/40; B01J 23/42; B01J 23/74
[52] U.S. Cl. .................. 252/466 B; 252/466 PT; 252/472; 34/10
[58] Field of Search ............... 252/455 R, 459, 466 B, 252/466 PT, 472; 34/10

[56] References Cited

U.S. PATENT DOCUMENTS

| | | | |
|---|---|---|---|
| 4,005,186 | 1/1977 | Ficalora et al. | 252/472 X |
| 4,058,485 | 11/1977 | Cheung | 252/477 R |
| 4,115,927 | 9/1978 | Rosensweig | 422/139 X |

*Primary Examiner*—W. J. Shine
*Attorney, Agent, or Firm*—Llewellyn A. Proctor

[57] ABSTRACT

This invention relates to improvements in a process for the preparation of a magnetic catalyst, particularly a magnetic reforming catalyst. In such process, a Group VIII noble metal is incorporated within an inorganic oxide particulate mass, suitably by impregnation of preformed particles. The metal-containing inorganic oxide particulate mass, in the desired proportion, is then admixed with magnetic alloy particles, notably iron or cobalt, and an inorganic oxide precursor which serves as a binder, to form a particulate composite mass comprised of particles of magnetic alloy dispersed as inclusions within an inorganic oxide matrix.

12 Claims, No Drawings

PROCESS FOR THE PREPARATION OF MAGNETIC CATALYSTS

BACKGROUND OF THE INVENTION AND PRIOR ART

Catalytic reforming, or hydroforming, is a well established industrial process employed by the petroleum industry for improving the octane quality of naphthas or straight run gasolines. In reforming, a multi-functional catalyst is employed which contains a metal hydrogenation-dehydrogenation (hydrogen transfer) component, or components, substantially atomically dispersed upon the surface of a porous, inorganic oxide support, notably alumina. Noble metal catalysts, notably platinum, have been widely used commerically in recent years in the production of reforming catalysts, and platinum on alumina catalysts have been commerically employed in refineries for the last few decades. In the last decade, additional metallic components have been added to platinum as promoters to further improve the activity or selectivity, or both, of the basic platinum catalyst, e.g., iridium, rhenium, tin, and the like. Reforming is defined as the total effect of the molecular changes, or hydrocarbon reactions, produced by dehydrogenation of cyclohexanes and dehydroisomerization of alkylcyclopentanes to yield aromatics; dehydrogenation of paraffins to yield olefins; dehydrocyclization of paraffins and olefins to yield aromatics; isomerization of n-paraffins; isomerization of alkylcycloparaffins to yield cyclohexanes; isomerization of substituted aromatics; and hydrocracking of paraffins which produces gas, and inevitably coke, the latter being deposited on the catalyst.

In reforming, a series of reactors constitute the heart of the reforming unit. Each reactor is generally provided with fixed beds of catalyst which receive upflow or downflow feed, and each is provided with preheater or interstage heater, because the reactions which take place are endothermic. A naphtha feed, with hydrogen, or recycle gas, is concurrently passed through a preheat furnace and reactor, and then in sequence through subsequent heaters and reactors of the series. The product from the last reactor is separated into a liquid fraction, i.e., a $C_5^+$ or $C_5/430°$ fraction, and a vaporous effluent. Hydrogen or gas rich in hydrogen which usually contains small amounts of normally gaseous hydrocarbons, is separated from the latter, and recycled to the first reactor of the unit to minimize coke production. During operation, process temperature is gradually raised to compensate for the catalyst activity loss caused by the coke deposition. Eventually, however, economics dictates the necessity of reactivating the catalyst. Consequently, in all processes of this type the catalyst must necessarily be periodically regenerated, and this is usually done by burning the coke off the catalyst at controlled conditions; and thereafter, reactivation of the catalyst is completed in a sequence of steps wherein the agglomerated metal hydrogenation-dehydrogenation components are atomically redispersed.

In recent months considerable thought has been given to improving reforming processes, particularly by providing short cycle processes which, inter alia, utilize beds of fluidizable magnetizable catalytic particles which are contacted, and fluidized, with a naphtha feed and hydrogen at reforming conditions to produce a naphtha product of improved octane while simultaneously the fluidized beds are subjected to an axially applied magnetic field. In such processes the activity and selectivity of the catalyst throughout the operation approximates that of fresh, or freshly-reactivated catalyst, and preferably the operation is conducted at high severity conditions, as contrasted with present commercially produced reforming operations. In the improved processes, and as described by application Ser. Nos. 054,032 and 054,033 filed July 2, 1979, continuous operation of all portions of the reforming unit is conducted, and the catalyst is moved therethrough as a more cohesive phase, or phase of narrow age distribution. Such processes are admirably suitable for conducting operations with a wide variety of feeds, particularly at high temperatures and low pressures, or other high severity conditions.

The application of a magnetic field upon a bed of fluidized, magnetizable catalytic particles in its preferred aspects stabilizes the bed and thereby suppresses, or minimizes bubble formation. The characteristics attributed to the stablized bed greatly improve gas-solids contacting and lessen the need for long residence times; and yet the state of the bed is such that it can be rapidly recycled between reactor and regenerator. The properties of the bed in a magnetically stabilized state approach those of plug flow, thus providing the higher gas-solids contacting efficiencies offered by fixed bed contacting. Yet the magnetically stabilized bed, since it is fluidized, offers the advantages of fluidized beds for purposes of transport. Shorter contact times become feasible, and desirable because of higher average catalyst activity level. Moreover, the small particles which in a fixed bed would have a prohibitively high pressure drop at reasonable gas velocities provide very large surface areas which enhance catalysis and gas-solids contacting.

The catalyst employed in a magnetically stabilized bed operation is necessarily constituted of composite particles, preferably small particles, suitably particles which range in average diameter below about 800 microns, more preferably those which range from about 100 to 300 microns. The particles contain, besides a carrier or support material, a sufficient amount of a ferromagnetic or ferrimagnetic material to make the particles magnetizable, and a hydrogenation-dehydrogenation component, or components. A reforming catalyst also contains a halide component and, preferably, the catalyst is sulfided. Preferred magnetizable materials include ferromagnetic and ferrimagnetic alloys of metals, and metallic metals such as iron, nickel, cobalt. In general, also, the non-magnetizable material will include a vast number of conventional materials which are inert and/or known to catalyze the desired reaction.

The magnetizable component can be directly incorporated with the non-magnetizable material. For example, the non-magnetizable materials may be impregnated with a soluble precursor of a ferromagnetic or ferrimagnetic substance, e.g., an oxide, which is subsequently reduced to render the particles ferromagnetic or ferrimagnetic. Alternatively, the ferromagnetic or ferrimagnetic material may be incorporated into the non-magnetizable component by encapsulation of finely divided ferromagnetic or ferrimagnetic material. Thereafter, the catalytic component, e.g., the Group VIII noble metal, or metals, (Periodic Table of the Elements; Sargent Welch Scientific Company, Copyright 1968) notably platinum and metals used as promoters, if any, are composited with a previously pilled, pelleted, beaded, or extruded particulate support material by the impregnation method. Pursuant to the impregnation method, porous refractory inorganic oxides in dry or solvated state are contacted, either alone or admixed, or otherwise incorporated with a metal or metals-containing solution, or solutions, and thereby impregnated by either the "incipient wetness" techniques, or a technique embodying absorption from a dilute or concentrated solution, or solutions, with subsequent filtration or evaporation to effect total uptake of the metallic components. Unfortunately, however, it is found that during impregnation of the catalytic metals onto the carriers, or supports, significant portions thereof are often lost or rendered catalytically inactive, or ineffective, apparently because the metals plate out on the ferromagnetic alloys or metals.

Only iron and cobalt, or alloys of such metals, have sufficiently high Curie temperatures to remain magnetic in high temperature operations, notably at the high process temperatures used in refining operations. Unfortunately too, only a few alloys of these metals are sufficiently passive that they can withstand attack by the liquids and gases of process streams; such attack often causing the metal alloys to become rapidly oxidized, this resulting in the loss of their magnetic character. Of the handful of metal alloys which are suitable for this purpose, e.g., stainless steel alloys, an unacceptable amount of the catalytic metal, e.g., Group VIII noble metal, notably platinum, is deposited on the alloy particles, the deposited catalytic metal being rendered ineffective in the performance of its catalytic function and thereby wasted. Such waste is obviously burdensome, and often intolerable.

It is accordingly a primary objective of the present invention to provide a novel composition, and process for the preparation of magnetic, catalytic composites to improve catalytic metals utilization.

A particular object is to provide a process of such character wherein magnetic ferrous metal alloy and catalytic metal components are incorporated as a part of said magnetic, catalytic composites without loss of the catalystic metals utilization.

A more particular object is to provide a process of said character for improving the catalytic effectiveness of the catalytic metal components added to said composites, especially Group VIII noble metals, notably platinum, which is incorporated with said composites.

These objects and others are achieved in accordance with the practice of the present invention which embodies a composition, and process wherein a Group VIII noble metal is incorporated within an inorganic oxide particulate mass, said inorganic oxide particulate mass is then admixed with magnetic alloy particles and an inorganic oxide precursor which serves as a binder, and the admixture is formed into a particulate composite mass characterized as magnetic alloy particles dispersed as inclusion within an inorganic oxide matrix.

Generally, in the practice of this invention, a portion of inorganic oxide particles, notably alumina, is contacted with a solution which contains a compound, or compounds, of a Group VIII noble metal, notably platinum, which is deposited within the composite particle in catalytically effective amounts. The noble metal, or noble metals-containing particulate portion, is then admixed or otherwise incorporated with magnetic alloy-particles and an inorganic oxide precursor, notably an alumina precursor, which acts as a binder to form composite particles containing said catalytic metal, or metals, and the magnetic alloy particles, the latter as inclusions within an inorganic oxide, or alumina matrix. By performing a catalyst, and then compositing said catalyst with magnetic alloy particles in this manner, the catalytic metals are in effect added to the total particulate mass in the desired quantity without significant loss of the catalytic metal as would normally be occasioned by the surface deposition of the catalytic metal upon said particulate magnetic alloy inclusions.

In its preferred aspects, a portion of catalyst is preformed in a conventional manner, suitably by cogelling catalytically effective amounts of a catalytic metal, or metals, with alumina, or by impregnation of preformed alumina particles by contact with a solution, or solutions, of catalytically effective amounts of said metal, or metals. The portion of catalyst is then admixed with the desired amount of a particulate magnetic alloy, notably a particulate magnetic alloy of iron or cobalt, especially a magnetic stainless steel alloy, and sufficient of an aluminum oxide precursor solution, or solution which contains a hydrous form of alumina and a neutralizing agent, to congeal and serve as a binder for the occluded catalytic particles and magnetic alloy particles. The admixture of catalyst, aluminum oxide precursor and magnetic alloy particles can be congealed by various known catalyst preparation techniques, especially spheroiding techniques, extrusion and spray drying being preferred.

The portion of preformed catalyst is made from a mass of particulate alumina of very small particle size, and in its preferred aspects the particular alumina is of average particle size ranging below about 150 microns, preferably from about 1 to 150 microns, more preferably from about 1 to about 50 microns. The small particle sizes provide considerably greater crush strength in the finsihed catalyst than provided by particles of relatively large size, which is particularly important in that the overall strength of the catalyst is lessened by the necessary addition of the particulate magnetic alloy. The mass of particulate alumina is impregnated with a solution, or solutions, containing a salt, or salts, of the catalytic metal, or metals, and the portion of catalyst is then dried and calcined. The portion of metals-containing catalyst is provided with sufficient of the hydrogenation component to provide the desired amount of metal, or metals, on the finished catalyst, this of course taking into account the amount of binder, calculated on a dry basis, and the amount of the inclusions. The finished catalyst, exclusive of the added alloy component, generally contains from about 0.01 percent to about 3 percent, preferably from about 0.2 percent to about 1 percent, of the catalytic metal, or metals (dry basis). This means, of course, that sufficient metal is added to the initial portion of the catalyst such that when it is combined with the binder, and thereby diluted, the finished catalyst will nonetheless contain the desired concentration of the metal. For example, if it is desired to produce a finished catalyst which contains 0.6 weight percent platinum (dry basis), then one would mix a portion of catalyst which contained 1.2 weight percent platinum (dry basis) with an equal weight of an aluminium oxide precursor (dry basis) to provide a finished catalyst containing the desired 0.6 weight percent platinum (dry basis), exclusive of the weight of the alloy particles. Or, one would mix a portion of catalyst which contained 1.2 weight percent platinum (dry basis) twice the weight of the aluminum oxide precursor (dry basis) to obtain a finished catalyst containing 0.4 weight percent platinum (dry basis), exclusive of the weight of alloy particles.

The catlyst portion is admixed with magnetic alloy particles of very small particle size, generally of average diameter ranging from about 5 microns to about 150 microns, preferably from about 10 microns to about 44 microns. Sufficient of the magnetic alloy particles and aluminum oxide precursor is used to provide composite particles which contain from about 0.05 percent to about 50 percent, preferably from about 5 percent to about 40 percent, based on total catalyst volume (dry basis), of the magnetic alloy particles, or from about 10 percent to about 80 percent, preferably from about 20 percent to about 60 percent, based on the weight of total catalyst (dry basis). In general, the finished composite catalyst contains from about 10 percent to about 40 percent, preferably from about 25 percent to about 35 percent, of the hydrogenation-dehydrogenation/inorganic oxide, or alumina component, from about 10 percent to about 40 percent, preferably from about 25 percent to about 35 percent, of the inorganic oxide, or alumina component added as a gel, and from about 20 percent to about 60 percent, preferably from about 30 percent to about 50 percent, of the magnetic alloy particles component, based on the total weight of the catalyst (dry basis). The composite catalyst is dried and calcined, and the catalytic metal, or metals, which may become agglomerated during calcination or spray drying, is readily redispersed by halogen treatment in conventional manner.

Plating out of the catalytic metal, or metals, upon said alloy particles component is avoided by predispersion of catalytically effective amounts of the catalytic metal, or metals, throughout a support material prior to incorporation of the magnetic alloy particles within the composite. In the present process, the catalytic effectiveness of the metal, or metals, is the same, or essentially the same, as would be obtained in a catalyst otherwise similar in composition, and similarly prepared, exclusive of the presence of the particulate magnetic alloy component. Albeit the catalytic metal, or metals, of the catalyst composite are agglomerated, e.g., during use, while drying or on calcination at high temperature in the presence of an agglomerating atmosphere, the agglomeration and nature of the agglomeration is the same, or essentially the same, as would be expected in ordinary catalyst preparation, and use, and the catalytic metal, or metals, are readily redispersed in conventional manner. The phenomenon thus differs from the loss normally experienced with that of depositing the catalytic metal, or metals, on a particle containing the particulate magnetic alloy component wherein the effectiveness of the catalytic metal, or metals, is lessened, or lost as apparently occasioned by plating out of some of the catalytic metal, or metals, upon the particulate magnetic alloy component.

The catalyst employed in accordance with this invention is thus necessarily constituted of composite particles which contain a carrier or support material, sufficient amounts of the particulate magnetic alloy to make the composite particles magnetizable, and a catalytically effective amount of a Group VIII noble metal, or metals component, or components. It also includes a halide component and, the catalyst may be sulfided. The first step in the preparation of the catalyst requires the preparation of a catalyst which is conventional and conventionally prepared in all respects. A porous, refractory inorganic oxide, particularly alumina, is employed as a carrier material, or support. The support can contain, e.g., one or more of alumina, bentonite, clay, diatomaceous earth, zeolite, silica, activated carbon, magnesia, zirconia, thoria, and the like; though the most preferred support is alumina to which, if desired, can be added a suitable amount of other refractory carrier materials such as silica, zirconia, magnesia, titania, etc., usually in a range of about 1 to 20 percent, based on the weight of the support. A preferred support for the practice of the present invention is one having a surface area of more than 50 $m^2/g$, preferably from about 100 to about 300 $m^2/g$, a bulk density of about 0.3 to 1.0 g/ml, preferably about 0.4 to 0.8 g/ml, an average pore volume of about 0.2 to 1.1 ml/g, preferably about 0.3 to 0.8 ml/g, and an average pore diameter of about 30 to 300 Å.

The Group VIII metal hydrogenation-dehydrogenation component, or components, can be composited or intimately associated with the porous inorganic oxide, alumina support or carrier by various techniques known to the art such as ion-exchange, coprecipitation with the alumina in the sol or gel form, and the like. For example, the catalyst composite can be formed by adding together suitable reagents such as salt of platinum and ammonium hydroxide or carbonate, and a salt of aluminum such as aluminum chloride or aluminum sulfate to form aluminum hydroxide. The aluminum hydroxide containing the salts of platinum can then be heated, dried, formed into pellets or extruded, and then calcined in nitrogen or other non-agglomerating atmosphere. The metal hydrogenation components can also be added to the catalyst by impregnation, typically via an "incipient wetness" technique which requires a minimum of solution so that the total solution is absorbed, initially or after some evaporation. Impregnation onto the support by the absorption method is preferred.

Various metals from the Group VIII noble metals can be composited with the support, usually as an element, or a compound or salt of an element of such group (Periodic Table of the Elements; Sargent Welch Scientific Company, Copyright 1968). Exemplary of the Group VIII metal hydrogenation-dehydrogenation metals are palladium, rhodium, ruthenium, iridium, osmium and platinum, platinum being a highly preferred component. Promoters can be added, if desired. Such promoters can include suitably a component selected from the Group IV metals, Group VI metals, Group VII metals, and Group VIII metals. For example, germanium, tin, lead, osmium, ruthenium, or rhodium can be used, and iridium or rhenium, or both, are preferred. Although one or more of these components can be added by any of the conventional methods, it is preferable to add them by impregnation prior to, following or simultaneously with the impregnation of the noble metal.

It is generally preferred to deposit the Group VIII noble metal, or metals, and metals used as promoters, if any, on a powdered particulate support material by the impregnation method. Pursuant to the impregnation method, porous refractory inorganic oxides in dry or solvated state are contacted, either alone or admixed, or otherwise incorporated with a metal or metals-containing solution, or solutions, and thereby impregnated by either the "incipient wetness" technique, or a technique embodying absorption from a dilute or concentrated solution, or solutions, with subsequent filtration or evaporation to effect total uptake of the metallic components.

The Group VIII noble metal component is supported on the carrier within the range which will provide, on the finished catalyst composite, a concentration of from about 0.01 to 3 percent, preferably from about 0.2 to about 1 percent, based on the weight of the composite catalyst (dry basis) exclusive of the added magnetic alloy component. In compositing the metals with the carrier, essentially any soluble compound can be used, but a soluble compound which can be easily subjected to thermal decomposition and reduction is preferred, for example, inorganic salts such as halide, nitrate, inorganic complex compounds, or organic salts such as the complex salt of acetylacetone, amine salt, and the like. Where, e.g., the Group VIII noble metal is platinum, platinum chloride, platinum nitrate, chloroplatinic acid, ammonium chloroplatinate, platinum polyamine, platinum acetylacetonate, and the like, are preferably used. The promoter metal, when employed, is added in concentration which will provide, on the finished catalyst composite, a concentration ranging about 0.01 to 3 percent, preferably from about 0.05 to about 1 percent, based on the weight of the composite catalyst (dry basis), exclusive of the magnetic component.

The catalyst is dried by heating at a temperature above about 80° F., preferably between about 150° F. and 300° F., in the presence of nitrogen or oxygen, or both, in an air stream or under vacuum. The catalyst is calcined at a temperature between about 500° F. to 1200° F., preferably about 500° F. to 1000° F., either in the presence of oxygen in an air stream or in the presence of an inert gas such as $N_2$.

The catalyst, if not sufficiently small, is preferably ground or crushed to a particulate mass of small particle size. A portion of the catalyst, is then admixed or otherwise dispersed with the particulate magnetic alloy and inorganic oxide precursor, suitably in the following proportions, based on the weight of the finished composite (dry basis), to wit:

|  | Inorganic Oxide Catalytic Metal-Containing Component Wt. % | Inorganic Oxide Gel Precursor Component, Wt. % | Particulate Magnetic Alloy Component, Wt. % |
| --- | --- | --- | --- |
| Typical | 10–40 | 10–40 | 20–60 |
| Prefered | 25–35 | 25–35 | 30–50 |

A halide is added to the composite to enhance catalyst performance. Fluorine and chlorine are preferred halogen components. The halogen is contained on the catalyst within the range of 0.1 to 3 percent, preferably within the range of about 0.3 to 2 percent, based on the weight of the catalyst. When using chlorine as a halogen component, it is contained on the catalyst within the range of about 0.2 to 2 percent, preferably within the range of about 0.5 to 1.5 percent; based on the weight of the catalyst. The introduction of halogen into catalyst can be carried out by any method and at any time of the catalyst preparation, for example, prior to, following or simultaneously with the impregnation. In the usual operation, the halogen component is introduced simultaneously with the incorporation of the metal hydrogenation-dehydrogenation component. It can also be introduced by contacting a carrier material in a vapor phase or liquid phase with a halogen compound such as hydrogen fluoride, hydrogen chloride, ammonium chloride, or the like.

A sulfur component may be added. The sulfur content of the catalyst, if employed, will generally range to about 0.2 percent, or more generally from about 0.02 percent to about 0.1 percent, based on the weight of the catalyst (dry basis). The sulfur can be added to the catalyst by conventional methods, suitably by breakthrough sulfiding of a bed of the catalyst with a sulfur-containing gaseous stream, e.g., hydrogen sulfide in hydrogen, performed at temperatures ranging from about 350° F. to about 1050° F. and at pressures ranging from about 1–40 atmospheres for the time necessary to achieve breakthrough, or the desired sulfur level.

The catalyst composites of this invention may be in the form of powder, beads, tablets, pills, spheres, pellets or extrudates. The feed or charge stock can be a virgin naphtha, cracked naphtha, a Fischer-Tropsch naphtha, or the like. Typical feeds are those hydrocarbons containing from about 5 to 12 carbon atoms, or more preferably from about 6 to about 9 carbon atoms. Naphthas, or petroleum fractions boiling within the range of from about 80° F. to about 450° F., and preferably from about 125° F. to about 375° F., contain hydrocarbons of carbon numbers within these ranges. Typical fractions thus usually contain from about 15 to about 80 Vol. % paraffins, both normal and branched, which fall in the range of about $C_5$ to $C_{12}$, from about 10 to 80 Vol. % of naphthenes falling within the range of from about $C_6$ to $C_{12}$, and from 5 through 20 Vol. % of the desirable aromatics falling within the range of from about $C_6$ to $C_{12}$.

The reforming runs are initiated by adjusting the hydrogen and feed rates, and the temperature and pressure to operating conditions. The run is continued at optimum reforming conditions by adjustment of the major process variables, within the ranges described below:

| Major Operating Variables | Typical Process Conditions | Preferred Process Conditions |
| --- | --- | --- |
| Pressure, Psig | 50–750 | 100–300 |
| Reactor, Temp., °F. | 900–1200 | 950–1050 |
| Recycle Gas Rate, SCF/B | 1000–10,000 | 1500–3000 |
| Feed Rate, W/Hr/W | 0.5–10 | 2.5–5 |

Methods of regeneration, and reactivation of these catalyst are conventional per se and form no part of the present invention. Reference is made, e.g., to Column 8, lines 47–68; Column 9, lines 1–68; and Column 10, lines 1–10 of U.S. Pat. No. 4,125,455 by K. R. Clem et al which describes acceptable procedures; these portions of this patent being herewith incorporated by reference. Conventionally, an isolated reactor which contains a bed of catalyst, the latter having reached an objectionable degree of deactivation due to coke deposition thereon, is first purged of hydrocarbon vapors with a nonreactive or inert gas, e.g., helium, nitrogen, or flue gas. The coke or carbonaceous deposits are then burned from the catalyst by contact with an oxygen-containing gas at controlled temperature below the sintering point of the catalyst, generally below about 1300° F., and preferably below about 1200° F.

The agglomerated metals of the catalyst are redispersed and the catalyst reactivated by contact of the catalyst with halogen, suitably a halogen gas or a substance which will decompose in situ to generate halogen. The gas is generally introduced as halogen, or halogen-containing gaseous mixture, into the reforming zone and into contact with the catalyst at temperatures ranging from about 550° F. to about 1150° F., and preferably from about 700° to about 1000° F. The introduction may be continued up to the point of halogen breakthrough, or point in time when halogen is emitted from the bed downstream of the location of entry where the halogen gas is introduced. After redispersing the metals via the halogen treatment, the catalyst can then be rejuvenated by soaking in an admixture of air which contains about 6 wt. percent oxygen, at temperatures ranging from about 850° F. to about 950° F. Oxygen is then purged from the reaction zone by introduction of a nonreactive or inert gas, e.g., nitrogen, helium or flue gas, to eliminate the hazard of a chance explosive combination of hydrogen and oxygen. A reducing gas, preferably hydrogen or a hydrogen-containing gas generated in situ or ex situ, is then introduced into the reaction zone and contacted with the catalyst at temperatures ranging from about 400° F. to about 1100° F., and preferably from about 650° F. to about 950° F., to effect reduction of the metal hydrogenation-dehydrogenation components, contained on the catalysts.

The invention will be more fully understood by reference to the following simulated data illustrating its more salient features. All parts are given in terms of weight except as otherwise specified.

In the following examples a magnetic catalyst of the present invention (Catalyst A) is prepared and its performance compared in actual reforming runs with two conventional non-magnetic catalysts (Catalyst B and C). Additionally, the performance of Catalyst A in a reforming run at similar conditions is compared with magnetic catalysts (Catalysts D and E), similar to Catalysts A in all respects except that the catalytic metal of the catalysts was not redispersed after it had become agglomerated in preparation.

EXAMPLES

Catalyst Preparation

Catalyst A, the catalyst of the present invention, was prepared as follows:

A precalcined <400 mesh (Tyler) spray dried reforming grade alumina was impregnated with an $H_2PtCl_6HCl$ solution in amount sufficient to provide nominally 0.6% Pt and 1.5% chloride on the alumina. The catalyst was then dried and calcined. Equal weight portions, on a dry weight basis, of the impregnated alumina and an alumina gel were spray dried together at 900° F. with a 410 stainless steel powder, the catalyst obtained from the spray drier being of the following composition, to wit:
- 30 wt. % pre-impregnated $al_2O_3$,
- 30% non-impregnated $Al_2O_3$,
- 40% 410 stainless steel powder.

A portion of the spray dried catalyst was then calcined at 900° F., and then treated to redisperse the agglomerated platinum component. The catalyst was thus heated to 975° F. in a 60% $O_2$/94% $N_2$ gas stream over a 2-3 hour period, and then held at this temperature for an additional ½ hour; then treated for ½ hour with a gas stream of 93.5% $N_2$/6% $O_2$/0.5% $Cl_2$; and then held at 975° F. in a 94% $N_2$/6% $O_2$ gas stream for 2 hours, and then reduced to ambient temperature.

The catalyst was then reduced in hydrogen at 900° F., and then tested in a fixed bed pilot plant reforming reactor charged with 5 to 10 grams of the catalyst.

Four additional catalysts were prepared:

Catalyst B and C were prepared for use as control catalyst. These catalysts were both non-magnetic (i.e., contain no magnetic particles), but in all other respects are similar to Catalyst A. The plantium contained on the catalyst is well dispersed.

Catalyst D and E, also magnetic catalysts, were prepared. These catalysts are similar, and were prepared in similar manner to Catalyst A except that the platinum redispersion steps were omitted.

Reforming Runs

These catalysts were each then charged into a reactor, and therein the catalysts are heated to reaction temperature by a desending, hydrogen-hydrocarbon mixture.

A light Arabian paraffinic virgin naphtha feed having the inspections given in Table I was charged downflow with hydrogen into a reactor, to wit:

TABLE I

| ASTM Distillation, °F. | |
|---|---|
| Initial | 183 |
| 5 | 213 |
| 10 | 220 |
| 30 | 238 |
| 50 | 262 |
| 70 | 288 |
| 90 | 317 |
| 95 | 326 |
| Final B.P. | 360 |
| Gravity, °API | 60.0 |
| Analysis, Vol. Percent | |
| Paraffins | 69.0 |
| Naphthenes | 18.1 |
| Aromatics | 12.9 |

Reforming in each run, was carried out at conditions required to produce a 100 RON product, i.e., at 950° F. EIT (average), 100 psig (average), and 4800 SCF/Bbl (average). The aromatics content of each product was measured, sine it is not possible to obtain an octane measurement with a knock engine, and product octane was estimated from a correlation based on reforming this same feed in a larger pilot plant; this value being given in terms of a catalyst performance number. The catalyst performance number (CPN) is an index that includes activity, octane producibility and process conditions.

Following a 1.5 hour line out period, four balance periods were taken at 1.5 hour intervals and the data plotted to determine the performance of each catalyst at the seventh hour on oil for comparison purposes.

The results of these tests are given in the Table II below.

TABLE II

| | 950° F., 100 psig, 4800 SCF/B | |
|---|---|---|
| Catalyst | Activity CPN @ Hour 7 | $C_5^+$ Yield, LV % 100 RON @ Hour 7 |
| A | 125 | 77.5 |
| B | 125 | 78.9 |
| C | 120 | 78.0 |
| D | 45 | 70.9 |
| E | 60 | 72.3 |

These data show that the performance of Catalyst A closely approximates that obtained by Cataysts B and C. The performance of Catalysts D and E, however, is quite poor. This is because the platinum dispersed on the alumina catalyst support is highly agglomerated as contrasted with that contained on Catalyst A. The high metals agglomeration, which occurred on Catalysts D and E during the spray drying step, causes considerably diminished activity and lower $C_5^+$ liquid yield than Catalyst A.

It is apparent that various modifications or changes can be made, as in the temperature, solution concentration, and the like, without departing from the spirit and scope of the invention.

Having described the invention, what is claimed is:

1. In a process for the preparation of a catalyst for use in reforming a hydrocarbon feed in a reforming zone at reforming conditions, wherein a bed of fluidizable, magnetizable catalytic particles is contacted and fluidized with a hydrocarbon feed and hydrogen while simultaneously subjected to an applied magnetic field, and a product of improved octane is withdrawn from said reforming zone, the improvement which comprises incorporating a Group VIII noble metal within an inorganic oxide particulate mass, admixing said metal-containing inorganic oxide particulate mass with magnetic alloy particles and an inorganic oxide precursor which serves as a binder, forming a particulate composite mass comprising particles of magnetic alloy dispersed as inclusions within an inorganic oxide matrix, and then drying and calcining said composite mass.

2. The process of claim 1 wherein the Group VIII noble metal is comprised of platinum.

3. The process of claim 1 wherein the Group VIII noble metal-containing inorganic oxide particulate mass, said magnetic alloy particles and inorganic oxide precursor are admixed to form said particulate composite mass, the particulate composite mass is dried and calcined, and the composition of the dried calcined composite, based on the weight of the composite, ranges as follows:

from about 10% to about 40% of the Inorganic oxide/Group VIII noble metal component, from about 20% to about 60% of the magnetic alloy particles component, and from about 10% to about 40% of the inorganic oxide component, added as a gel precursor.

4. The process of claim 3 wherein the particulate composite is of the following approximate composition:

the Inorganic oxide/Group VIII noble metal component ranges from about 25% to about 35%, the magnetic alloy particles component ranges from about 30% to about 50%, and the inorganic oxide component added as a gel precursor ranges from about 25% to about 35%.

5. The process of claim 3 wherein the Group VIII noble metal is platinum.

6. The process of claim 3 wherein the magnetic alloy particles are comprised of iron or cobalt.

7. The process of claim 3 wherein the inorganic oxide component of the inorganic oxide particulate mass is principally alumina.

8. The process of claim 3 wherein the Group VIII noble metal is platinum, the magnetic alloy particles are comprised of iron or cobalt, and the inorganic oxide component provided by said inorganic oxide particulate mass and inorganic oxide precursor is principally alumina.

9. The process of claim 1 wherein the Group VIII noble metal is incorporated in the metals-containing inorganic oxide particulate mass by impregnation.

10. The process of claim 9 wherein the Group VIII noble metal is platinum, and the inorganic oxide particulate mass is of average particle size ranging from about 1 micron to about 150 microns.

11. The process of claim 1 wherein the Group VIII noble metal is platinum, the magnetic alloy particles are comprised of iron or cobalt, the inorganic oxide component provided by the inorganic oxide particulate mass and inorganic oxide precursor is principally alumina, and the composition of the particulate, dried and calcined composite, based on the weight of the composite, ranges as follows:

from about 10% to about 40% of the alumina/platinum component, from about 20% to about 60% of the magnetic alloy particles, and from about 10% to about 40% alumina component added as a gel.

12. The process of claim 11 wherein the particulate composite is of the following approximate composition from about 25% to about 35% of the alumina/platinum component, from about 30% to about 50% of the magnetic alloy particles, and from about 25% to about 35% alumina component added as a gel.

* * * * *